(12) United States Patent
Li et al.

(10) Patent No.: US 7,352,752 B2
(45) Date of Patent: Apr. 1, 2008

(54) FRAME MAPPING SCHEDULER WITH COMPRESSED MAPPING TABLE

(75) Inventors: Jinhui Li, Macungie, PA (US); Mark Benjamin Simkins, Macungie, PA (US); Hong Wan, Phillipsburg, NJ (US)

(73) Assignee: Agere Systems Inc., Allentown, PA (US)

( * ) Notice: Subject to any disclaimer, the term of this patent is extended or adjusted under 35 U.S.C. 154(b) by 676 days.

(21) Appl. No.: 10/998,686

(22) Filed: Nov. 29, 2004

(65) Prior Publication Data

US 2006/0117054 A1 Jun. 1, 2006

(51) Int. Cl.
*H04L 12/28* (2006.01)
(52) U.S. Cl. .............................................. 370/395.4 H
(58) Field of Classification Search ...................... None
See application file for complete search history.

(56) References Cited

U.S. PATENT DOCUMENTS 6,317,416 B1 * 11/2001 Giroux et al. .............. 370/232

OTHER PUBLICATIONS

Golestani, A Self-Clocked Fair Queueing Scheme for Broadband Applications, IEEE, pp. 636-646, 1994.*
Itai et al, A Golden Ratio Control Policy for a Multiple-Access Channel, IEEE, pp. 712-718, 1984.*
U.S. Appl. No. 10/903,954, filed Jun. 30, 2004, Li et al.
U.S. Appl. No. 10/722,933, filed Nov. 26, 2003, Khan et al.
S.S. Panwar et al., "Golden Ratio Scheduling for Flow Control in Low Buffer Requirements," IEEE Transactions on Communications, vol. 40, No. 4, pp. 765-772, Apr. 1992.

* cited by examiner

*Primary Examiner*—Frank Duong

(57) ABSTRACT

A network processor or other processing device of a communication system includes scheduling circuitry configured to schedule data blocks for transmission from a plurality of users or other transmission elements in timeslots of a frame. The scheduling circuitry utilizes a mapping table. The mapping table comprises at least one entry specifying a mapping between a particular timeslot of the frame and a particular one of the transmission elements. The scheduling circuitry determines a particular transmission element to be scheduled in a given timeslot by accessing a corresponding mapping table entry to identify the particular transmission element. The mapping table is stored in a compressed format in memory circuitry associated with the scheduling circuitry. More specifically, the mapping table is stored as a compressed mapping table in which a particular entry identifies one of a plurality of stored values which is processed to determine a corresponding uncompressed mapping table entry.

21 Claims, 4 Drawing Sheets

FIG. 4

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| $U_1$ | $U_1$ | $U_1$ | $U_1$ | $U_1$ | $U_2$ | $U_2$ | $U_3$ | $U_3$ | $U_3$ | *$U_3$* | $U_3$ | $U_3$ | $U_4$ | $U_4$ | $U_4$ |

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| 13 | 5 | *3* | *10* | 2 | 15 | 7 | 12 | 4 | 9 | 1 | 14 | 6 | 11 | 3 | 8 |

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| 13 | 5 | *3* | *10* | 2 | 15 | 7 | 12 | 4 | 9 | 1 | 14 | 6 | 11 | 3 | 8 |
| $U_1$ | $U_2$ | *$U_3$* | $U_1$ | $U_4$ | $U_3$ | $U_3$ | $U_1$ | $U_3$ | $U_1$ | $U_4$ | $U_2$ | $U_3$ | $U_1$ | $U_3$ | $U_1$ |

FIG. 7

| MAPPING TABLE INDEX - $i$ | MAPPING TABLE ENTRY - $M_i$ | $S_i = M_i - M_{i-1}$ | $S_i$ | $C_i$ |
|---|---|---|---|---|
| 0 | 0 | - | - | - |
| 1 | 5 | 5 | V1 | 1 |
| 2 | 10 | 5 | V1 | 1 |
| 3 | 15 | 5 | V1 | 1 |
| 4 | 3 | -12 | V2 | 2 |
| 5 | 8 | 5 | V1 | 1 |
| 6 | 13 | 5 | V1 | 1 |
| 7 | 1 | -12 | V2 | 2 |
| 8 | 6 | 5 | V1 | 1 |
| 9 | 11 | 5 | V1 | 1 |
| 10 | 4 | -7 | V3 | 3 |
| 11 | 9 | 5 | V1 | 1 |
| 12 | 14 | 5 | V1 | 1 |
| 13 | 2 | -12 | V2 | 2 |
| 14 | 7 | 5 | V1 | 1 |
| 15 | 12 | 5 | V1 | 1 |

FIG. 8

| | UNCOMPRESSED | COMPRESSED |
|---|---|---|
| WIDTH OF EACH MAPPING TABLE ENTRY | $\lceil \log_2(F) \rceil$-bit | 2-bit |
| TABLE SIZE | $\lceil \log_2(F) \rceil * F$-bit | $2*F$-bit |
| TABLE SIZE (F=16) | 64-bit | 32-bit |
| TABLE SIZE (F=32K) | 480K-bit | 64K-bit |
| TABLE SIZE (F=1M) | 20M-bit | 2M-bit |

FRAME MAPPING SCHEDULER WITH COMPRESSED MAPPING TABLE

RELATED APPLICATION(S)

The present application is related to U.S. patent application Ser. No. 10/903,954, filed Jul. 30, 2004 in the name of inventors Jinhui Li et al. and entitled "Frame Mapping Scheduler," the disclosure of which is incorporated by reference herein.

FIELD OF THE INVENTION

The present invention relates generally to the field of telecommunications, and more particularly to schedulers used to control access to limited resources.

BACKGROUND OF THE INVENTION

In many telecommunications applications, a scheduler is used to resolve contention among multiple tasks competing for a limited resource. For example, such a scheduler is commonly used in a network processor to schedule multiple traffic flows for transmission over a specific transmission bandwidth.

A network processor generally controls the flow of data between a physical transmission medium, such as a physical layer portion of a network, and a switch fabric in a router or other type of switch. An important function of a network processor involves the scheduling of cells, packets or other data blocks, associated with the multiple traffic flows, for transmission to the switch fabric from the physical transmission medium of the network and vice versa. The network processor scheduler performs this function.

An efficient and flexible scheduler architecture capable of supporting multiple scheduling algorithms is disclosed in U.S. patent application Ser. No. 10/722,933, filed Nov. 26, 2003, and entitled "Processor with Scheduler Architecture Supporting Multiple Distinct Scheduling Algorithms," which is commonly assigned herewith and incorporated by reference herein.

It is often desirable for a given scheduling algorithm implemented in a network processor or other processing device to be both simple and fair. Simplicity is important because the processing device hardware typically does not have a large amount of time to make a given scheduling decision, particularly in a high data rate environment. A good scheduler should also be fair. For example, it may allocate the bandwidth according to the weights of the users, with the higher-priority users getting more bandwidth than lower-priority users.

An example of a simple and fair scheduling algorithm is the Weighted Round-Robin (WRR) scheduling algorithm. Assume that in a given telecommunications application there are a number of users competing for one resource, which can process one data block in each timeslot. The scheduler must decide which user can send one data block to the server in each timeslot. Each user has a weight to indicate its priority. The user with larger weight has higher priority. Under ideal conditions, the services received by the users should be proportional to their weights. A WRR scheduler serves the users in proportion to their weights in a round-robin fashion. Assume there are N users. The i-th user, $U_i$, has a weight of $W_i$, which is an integer. Let F be the sum of the weights $W_i$ for the N users. Define F timeslots as one frame, such that F is the frame size in timeslots. WRR serves $U_i$ for exactly $W_i$ timeslots in each frame. Therefore, each user gets their fair share of the frame. For example, assume there are four users $U_1$, $U_2$, $U_3$ and $U_4$ that have the weights of 4, 3, 2, and 1, respectively. Then the scheduler can serve these four users by repeating the following sequence per frame: $U_1$, $U_2$, $U_3$, $U_4$, $U_1$, $U_2$, $U_3$, $U_1$, $U_2$, $U_1$. There are ten timeslots in one frame, and $U_1$ can get four timeslots in each frame.

A problem with WRR is that it may cause long periods of burstiness. For example, consider a case in which there are 11 users, where $U_1$'s weight is 10 and all other users' weights are 1. In this case, the sum of the weights is 20, so there are 20 timeslots per frame. WRR would serve the users as follows: $U_1$, $U_2$, $U_3$, $U_4$, $U_5$, $U_6$, $U_7$, $U_8$, $U_9$, $U_{10}$, $U_{11}$, $U_1$, $U_1$, $U_1$, $U_1$, $U_1$, $U_1$, $U_1$, $U_1$, $U_1$. The service received by $U_1$ is very bursty. This is clearly not desirable in telecommunication systems, because long burstiness could overflow the buffers of user communication devices. Such burstiness becomes increasingly problematic in those practical applications in which the total number of users may be several hundreds or more.

Alternative scheduling algorithms are known which overcome the burstiness problem of WRR. These include, by way of example, Weighted Fair Queuing (WFQ) and Worst-case Fair Weighted Fair Queueing (WF²Q). Unfortunately, these alternative algorithms are typically considerably more complex than WRR, and therefore may be difficult to implement in network processors and other processing devices operating in high data rate environments.

The above-cited U.S. patent application Ser. No. 10/903,954 discloses a frame mapping scheduler that provides simplicity and fairness comparable to that of WRR, but without the burstiness problem commonly associated with WRR. More specifically, a frame mapping scheduler in an illustrative embodiment described therein comprises scheduling circuitry which utilizes a weight table and a mapping table. The weight table comprises a plurality of entries, with each of the entries identifying a particular one of the transmission elements. The mapping table comprises at least one entry specifying a mapping between a particular timeslot of a frame and an entry of the weight table. The scheduling circuitry determines a particular transmission element to be scheduled in a given timeslot by accessing a corresponding mapping table entry and utilizing a resultant value to access the weight table.

The mapping table entries may be predetermined in accordance with a golden ratio policy. As one more particular example, the entries of the mapping table may be determined by utilizing a golden ratio $\phi$ to compute $$G_i = (i * \phi^{-1}),$$

for a given range of index values i, such as i=0, 1, ... F−1, where F denotes the number of mapping table entries. The computed values are then sorted in ascending order or other specified order, and the entries are taken as a sequence of the resulting subscript indices.

It is also possible to determine the mapping table entries using other policies. For example, the scheduling circuitry may generate the entries of the mapping table as needed in accordance with a bit-reverse policy. In this case, a given entry of the mapping table is determined by computing a bit-reverse value of a corresponding timeslot number. This arrangement has the advantage of avoiding the need to store the mapping table.

However, in schedulers which utilize a golden ratio policy, or more generally any policy that requires a stored mapping table, the mapping table may be large and therefore require substantial amounts of memory. It is usually preferred that such mapping table memory be arranged "on-chip," that is, on the same integrated circuit as the scheduler, so as to reduce access times. For example, such an arrangement is beneficial in network processing applications in which data blocks may need to be processed substantially in real time.

Accordingly, techniques are needed for compressing the mapping table in order to reduce the amount of memory required to store the table, thereby facilitating its implementation in a network processor integrated circuit or other device comprising a frame mapping scheduler.

SUMMARY OF THE INVENTION

The present invention in an illustrative embodiment provides a frame mapping scheduler, implementable in a network processor or other processing device of a communication system, that utilizes a compressed mapping table.

In accordance with one aspect of the invention, a processing device includes scheduling circuitry configured to schedule data blocks for transmission from a plurality of users or other transmission elements in timeslots of a frame. The scheduling circuitry utilizes a mapping table. The mapping table comprises at least one entry specifying a mapping between a particular timeslot of the frame and a particular one of the transmission elements. The scheduling circuitry determines a particular transmission element to be scheduled in a given timeslot by accessing a corresponding mapping table entry to identify the particular transmission element, possibly but not necessarily in conjunction with another table, referred to herein as a weight table. The mapping table is stored in a compressed format in memory circuitry associated with the scheduling circuitry. More specifically, the mapping table is stored as a compressed mapping table in which a particular entry identifies one of a plurality of stored values which is processed to determine a corresponding uncompressed mapping table entry.

In one embodiment, the particular entry of the compressed mapping table identifies one of a plurality of stored values which if added to an accumulator will result in the corresponding uncompressed mapping table entry. Thus, an uncompressed mapping table entry may be generated from a corresponding compressed mapping table entry by utilizing the compressed mapping table entry to identify a particular one of the plurality of stored values, and adding the identified value to a current value of an accumulator to obtain the uncompressed mapping table entry.

The compressed mapping table may be generated, for example, by determining, for i=1 to F−1 where F denotes the number of schedulable timeslots in the frame, which particular one of a plurality of possible different values $S_i = M_i - M_{i-1}$ is associated with an i-th entry $M_i$ of the uncompressed mapping table, and storing in the corresponding entry of the compressed mapping table an identifier of a memory location storing that particular one of the plurality of possible different values.

As a more particular example, each of three possible different values $S_i$ may be stored in a different register, with the compressed memory table comprising F−1 two-bit entries each identifying one of the registers. In such an arrangement, the amount of memory capacity required to store the compressed mapping table is given approximately by 2·(F−1) bits.

Advantageously, the mapping table compression techniques of the present invention can provide a substantial reduction in the amount of memory required for storing the mapping table, particularly for large frame sizes. This allows the mapping table to be stored on-chip, thereby improving scheduler performance.

BRIEF DESCRIPTION OF THE DRAWINGS

FIGS. 4 and 5 show examples of a weight table and a mapping table, respectively, utilizable in a scheduler in an illustrative embodiment of the invention.

FIG. 6 is a table showing a scrambling result provided in conjunction with the weight table and mapping table of FIGS. 4 and 5.

FIG. 7 illustrates the compression of an exemplary mapping table in accordance with the invention.

FIG. 8 compares parameters of uncompressed mapping tables of various sizes with corresponding compressed mapping tables generated using an embodiment of the invention.

DETAILED DESCRIPTION OF THE INVENTION

The invention will be illustrated herein in conjunction with an exemplary system for processing data for transmission through a network. The exemplary system includes a network processor configured in a particular manner in order to illustrate the techniques of the invention. It should be understood, however, that the invention is more generally applicable to any communication system scheduler in which it is desired to provide improved scheduling without the burstiness problem associated with conventional WRR scheduling, utilizing a compressed mapping table.

A "processor" as the term is used herein may be implemented, by way of example and without limitation, utilizing elements such as those commonly associated with a microprocessor, central processing unit (CPU), digital signal processor (DSP), application-specific integrated circuit (ASIC), or other type of data processing device, as well as portions and combinations of such elements.

The present invention in an illustrative embodiment utilizes a frame mapping scheduler, of the type described in the above-cited U.S. patent application Ser. No. 10/903,954, but modified in accordance with the present invention to operate with a compressed mapping table. Advantageously, the invention in the illustrative embodiment substantially reduces the amount of memory required to store a mapping table for a golden ration policy or any other policy that requires a stored mapping table.

It should be noted that the scheduling techniques of the present invention may also or alternatively be used in conjunction with a flexible scheduler architecture capable of supporting multiple scheduling algorithms, such as that disclosed in the above-cited U.S. patent application Ser. No. 10/722,933.

Figure 1:
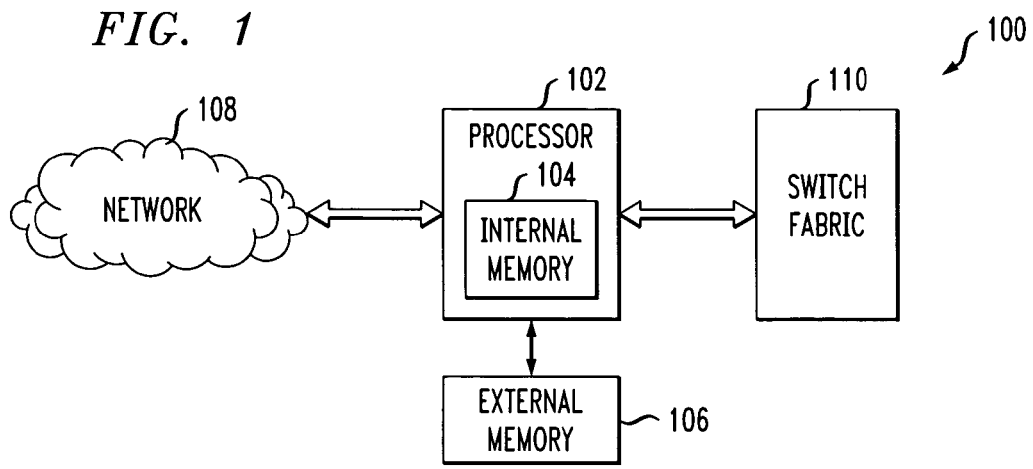
FIG. 1 is a simplified block diagram of an illustrative embodiment of a processing system in which the present invention is implemented.

FIG. 1 shows a network processing system 100 in which the invention is implemented. The system 100 includes a network processor 102 having an internal memory 104. The network processor 102 is coupled to an external memory 106 as shown, and is configured to provide an interface for communicating cells, packets or other arrangements of data between a network 108 and a switch fabric 110. All such arrangements of data are intended to be encompassed by the general term "data block" as used herein. It is to be appreciated that the invention does not require any particular size or configuration of data blocks.

The processor 102 and its associated external memory 106 may be implemented, e.g., as one or more integrated circuits installed on a line card or port card of a router or switch. In such a configuration, the switch fabric 110 is generally considered to be a part of the router or switch.

Figure 2:
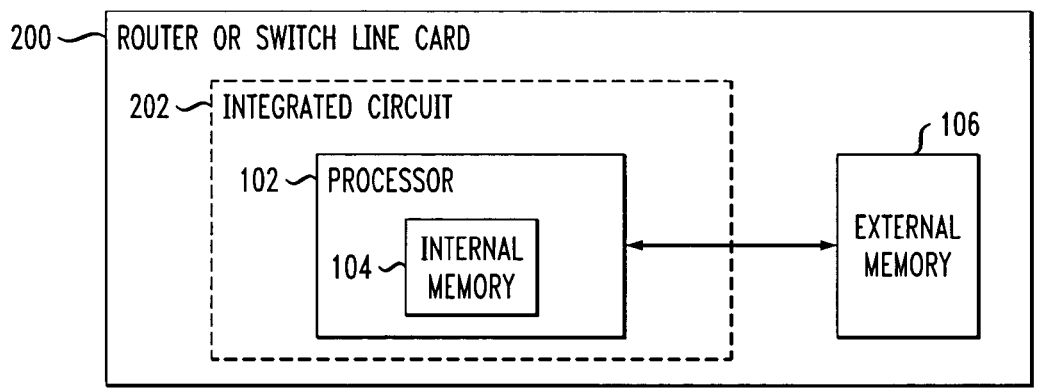
FIG. 2 illustrates one possible implementation of a network processor of the FIG. 1 system as an integrated circuit installed on a line card of a router or switch.

FIG. 2 illustrates an example router or switch line card embodiment of a portion of the system 100 of FIG. 1. In this embodiment, the processing system comprises a line card 200 having at least one integrated circuit 202 installed thereon. The integrated circuit 202 comprises network processor 102 which has internal memory 104. The network processor 102 interacts with external memory 106 on the line card 200. The external memory 106 may serve, e.g., as an external static random access memory (SRAM) or dynamic random access memory (DRAM) for the network processor integrated circuit 202. Such memories may be configured in a conventional manner. A suitable host processor may also be installed on the line card 200, and used for programming and otherwise controlling the operation of one or more network processor integrated circuits on the line card 200.

The portion of the processing system as shown in FIGS. 1 and 2 is considerably simplified for clarity of illustration. It is to be appreciated, however, that the processing system may comprise a router or switch which includes multiple line cards such as that shown in FIG. 2, and that each of the line cards may include multiple integrated circuits. A similar embodiment may be implemented in the form of a port card. However, the invention does not require such card-based implementation in a router, switch or other element.

It should also be understood that the particular arrangements of elements shown in FIGS. 1 and 2 are by way of illustrative example only. More specifically, as previously noted, the invention can be implemented in any type of processor or other communication system processing device, and is not limited to any particular network-based processing application.

Also, the system 100 and network processor 102 as illustrated in FIGS. 1 and 2 may include other elements in addition to or in place of those specifically shown, including one or more elements of a type commonly found in a conventional implementation of such a system and network processor. For example, the network processor may include a classifier, queuing and dispatch logic, one or more memory controllers, interface circuitry for interfacing the network processor with the network 108, the switch fabric 110, the host processor 112 and other external devices, as well as other conventional elements not explicitly shown in the figure. These and other conventional elements, being well understood by those skilled in the art, are not described in detail herein.

The functionality of the network processor 102 as described herein may be implemented at least in part in the form of software program code. For example, elements associated with the performance of scheduling operations in the network processor may be implemented at least in part utilizing elements that are programmable via instructions or other software that may be supplied to the network processor via an external host processor or other suitable mechanism. For example, information characterizing particular scheduling algorithms, or associated traffic shaping information, may be supplied to the network processor from the associated host processor or other suitable mechanism.

Figure 3:
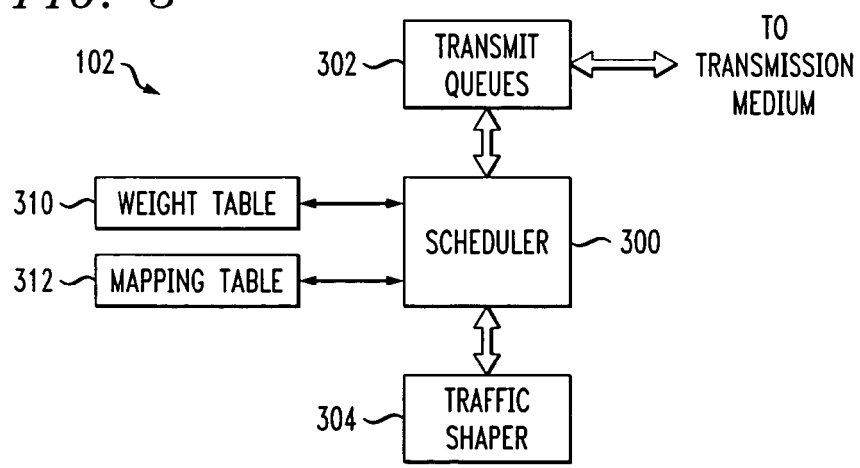
FIG. 3 is a more detailed view of a network processor of the FIG. 1 system configured in accordance with the techniques of the invention.

FIG. 3 shows a more detailed view of the network processor 102 in an illustrative embodiment of the invention. The network processor 102 in this embodiment includes a scheduler 300, transmit queues 302, a traffic shaper 304, a weight table 310, and a mapping table 312.

The weight table 310 and the mapping table 312 are examples of what are more generally referred to herein simply as "tables." Other types of tables may be used in alternative embodiments of the invention. The terms "utilize" or "utilizing" as used herein in conjunction with such tables should be understood to include processing at least one table entry. Thus, an entire table need not be utilized or made accessible at any given time.

Generally, the mapping table 312 is used to scramble frame timeslots in a manner that alleviates any burstiness problems that might otherwise arise from use of the weight table 310 to perform, for example, WRR scheduling or another type of weight-based scheduling. This may be accomplished, for example, by determining appropriate mapping table values which tend to randomize the mapping order.

A more particular example of a weight table 310 is shown in FIG. 4. An example of mapping table 312, based on a golden ration policy, is shown in FIG. 5. The timeslot scrambling effects provided by the FIG. 5 mapping table is shown in the table of FIG. 6.

In operation, the scheduler 300 schedules data blocks associated with the transmit queues 302 for transmission over one or more transmission media which are not explicitly shown. The scheduling utilizes the weight table 310 and mapping table 312, in conjunction with traffic shaping information from the traffic shaper 304 or without such information, in scheduling the data blocks associated with the transmit queues 302 for transmission.

As indicated previously, the network processor 102 may include additional elements, for example, of a type described in the above-cited U.S. patent applications, or of a conventional type known to those skilled in the art, and such elements, being described elsewhere, are not further described herein.

The scheduler 300 is an example of an element referred to more generally herein as "scheduling circuitry." In other embodiments, scheduling circuitry may include in addition to the scheduler 300 at least a portion of at least one of the weight table 310 and the mapping table 312, or other arrangements of one or more of hardware, software and firmware capable of implementing the scheduling techniques of the present invention. Thus, although shown as separate from the scheduler 300 in the figure, the weight table 310 and the mapping table 312 or suitable portions thereof may be at least partially incorporated into scheduling circuitry or an associated memory in accordance with the invention.

The scheduler 300 may utilize any arrangement of logic gates, processing elements or other circuitry capable of providing scheduling functionality of the type described herein. Scheduling circuitry in accordance with the invention may thus comprise otherwise conventional general-purpose network processor circuitry which is adaptable under software control to provide at least a portion of a scheduling function in accordance with the invention.

Numerous such circuitry arrangements will be readily apparent to those skilled in the art, and are therefore not described in detail herein.

The weight table 310 and mapping table 312 may be stored at least in part in the internal memory 104 of the network processor 102, and may also or alternatively be stored at least in part in the external memory 106 of the network processor 102. When stored using internal memory, at least a portion of such memory may be internal to the scheduler or other scheduling circuitry.

In addition to the table elements 310 and 312, scheduler 300 may include or otherwise have associated therewith a number of additional timeslot tables or other types of table elements suitable for use in static or dynamic table-based scheduling of a type described in the above-cited U.S. patent application, or of a type known in conventional practice.

The transmit queues 302 may be viewed as comprising a plurality of transmission elements. For example, the transmit queues may comprise a plurality of transmission queues and associated control logic, with each of the transmission queues corresponding to a transmission element. It should be noted, however, that the term "transmission element" as used herein is intended to be construed more generally so as to encompass any source of one or more data blocks, or other elements that are schedulable for transmission in the network processor 102.

Packets or other data blocks can be enqueued in transmission elements of the transmit queues 302 from an associated network processor data path, not explicitly shown in the figure. This may occur in conjunction with packet enqueue messages and associated data blocks received from such a data path. Similarly, packets or other data blocks can be dequeued from the transmission elements to the data path upon transmission, for example, in conjunction with packet dequeue messages and associated data blocks being sent to the data path.

The traffic shaper 304 may be implemented, by way of example, as an otherwise conventional traffic shaping engine which establishes one or more traffic shaping requirements, in a known manner, for the transmission of the data blocks from the transmission elements of the transmit queues 302. The traffic shaper 304 may be viewed as an example of what is more generally referred to herein as "traffic shaping circuitry," and other types of traffic shaping circuitry may be used in alternative embodiments. The traffic shaper may receive information regarding queue and scheduler status from the transmit queues 302 via the scheduler 300. The traffic shaper may generate traffic shaping information such as queue transmission interval and prioritization for establishing a class of service (CoS) or other desired service level for one or more of the transmission elements or their corresponding network connections.

As indicated above, in the network processor context the transmission elements, that is, the entities to be scheduled, may comprise queues. The present invention, however, can be used to schedule any type of elements for which data blocks are to be transmitted, and more generally any type of schedulable elements in a communication system processing device. Such elements are intended to be encompassed by the general term "transmission elements" as used herein, and may also be referred to herein as "users."

Exemplary frame mapping scheduling techniques implemented in scheduler 300 will now be described in greater detail with reference to the tables of FIGS. 4 through 6.

As noted previously, the mapping table 312 is used to scramble frame timeslots in a manner that alleviates the burstiness problem of conventional WRR scheduling.

In the illustrative embodiment, the mapping table 312 may comprise a table that is pre-calculated and fixed for a given scheduling application, which tends to reduce the complexity of the hardware used to implement the scheduler.

By way of example, assume that one frame is equal to 16 timeslots and the total number of users is four, with the four users being denoted $U_1$, $U_2$, $U_3$ and $U_4$. Of course, it is to be appreciated that these and other specific frame and timeslot configurations, user numbers, and other parameters or assumptions of examples described herein are not intended to limit the scope of the invention in any way.

The weight table 310 of FIG. 4 includes an entry for each of the 16 timeslots of a frame, with each entry denoting a particular one of the four users.

Let the weights for the four users be given by $W_1=5$, $W_2=2$, $W_3=6$, and $W_4=3$. Again, the sum of the weights in this example is equal to the frame size. A simple way to allocate the timeslots is to assign the first five timeslots to $U_1$, the next two timeslots to $U_2$, and so on, as shown in the weight table of FIG. 4. However, the results of such an assignment are bursty, especially when the frame size is very large.

In order to reduce the burstiness, the mapping table 312 of FIG. 5 is used to scramble the timeslots within the frame. The mapping table 312 includes an entry for each of the 16 timeslots of a frame, with each entry denoting a corresponding entry of the weight table. As noted previously, the mapping table may be pre-calculated and fixed. A wide variety of different mapping tables can be used in implementing the invention. The mapping table 312 of FIG. 5 is obtained based on a golden ratio policy, to be described below.

Using the weight table 310 of FIG. 4 and the mapping table 312 of FIG. 5, the scheduler 300 can determine the service order of the users. For example, at timeslot 3 of one frame, the scheduler will check index 3 of the mapping table. It returns 10. Then the scheduler checks index 10 of the weight table. It returns $U_3$. This means that at this timeslot, $U_3$ should be served. The scrambling result of the entire frame is shown in FIG. 6. It is clear that the burstiness is substantially reduced.

As disclosed in the above-cited U.S. application Ser. No. 10/903,954, it is possible to reduce the storage requirements associated with the weight table 310 by storing it in a compressed form. For example, a compressed weight table may have N entries, where N is the total number of users, with the i-th entry storing the value of $$\sum_{j=1}^{i} W_j - 1.$$

The last entry of the compressed weight table in this example will always be F−1, where F denotes the frame size. Thus, the last entry need not be explicitly stored, and the table can be further reduced in size to N−1 entries, where N again denotes the number of users. Using the compressed weight table saves memory space, but generally requires additional searching time. Therefore, in implementations in which memory size is limited, it may be preferable to utilize the compressed weight table, while in implementations in which computational power is limited, the uncompressed weight table may be preferred.

The manner in which the values of the mapping table 312 of FIG. 5 are obtained will now be described. As indicated above, the mapping table 312 is based on a golden ratio policy, which has been determined to yield excellent results in the illustrative embodiment. Details regarding conventional aspects of golden ratio scheduling can be found in S. S. Panwar et al., "Golden ratio scheduling for flow control in low buffer requirements," IEEE Trans. Communications, Vol. 40, No. 4, pp. 765-772, April 1992, which is incorporated by reference herein.

As is well known, the golden ratio is given by $$\phi=[(\sqrt{5}-1)/2]^{-1}=1.61803399\ldots$$

The entries for the mapping table 312 are determined utilizing the golden ratio by calculating $$G_i=(i*\phi^{-1})$$

for all i, i=0, 1, . . . F−1. This results in the following set of values for the present example in which the number of mapping table entries is 16:

$G_0=0$
$G_1=\phi \bmod 1=0.618034$
$G_2=2\phi \bmod 1=0.236068$
$G_3=3\phi \bmod 1=0.854102$
$G_4=4\phi \bmod 1=0.472136$
$G_5=5\phi \bmod 1=0.090170$
$G_6=6\phi \bmod 1=0.708204$
$G_7=7\phi \bmod 1=0.326238$
$G_8=8\phi \bmod 1=0.944272$
$G_9=9\phi \bmod 1=0.562306$
$G_{10}=10\phi \bmod 1=0.180340$
$G_{11}=11\phi \bmod 1=0.798374$
$G_{12}=12\phi \bmod 1=0.416408$
$G_{13}=13\phi \bmod 1=0.034442$
$G_{14}=14\phi \bmod 1=0.652476$
$G_{15}=15\phi \bmod 1=0.270510$ The values are then sorted in ascending order, resulting in the sequence $G_0, G_{13}, G_5, G_{10}, G_2, G_{15}, G_7, G_{12}, G_4, G_9, G_1, G_{14}, G_6, G_{11}, G_3, G_8$ The subscript indices in the previous line comprise the entries of the FIG. 5 mapping table resulting from a golden ratio policy. It should be noted that other ranges of index values may be used. For example, the index values may range from i=1 to F, or from i=M to M+F−1, where M denotes an integer. Also, numerous policies other than the golden ratio policy may be used in generating a given mapping table suitable for use in the network processor 102, as will be described in greater detail below.

The present invention in accordance with one aspect thereof provides techniques for compressing a mapping table such as the mapping table 312 of FIG. 5. This mapping table compression aspect of the invention will be described below with reference to FIG. 7 through 9.

As indicated above, the scheduler 300 may utilize a golden ratio policy or other type of policy which requires a stored mapping table. Thus, alternative ratios other than the golden ratio can be used. A given such alternative ratio will be denoted herein as R. It should be noted that, if R is equal to the golden ratio $\phi$ plus an integer I, it provides the same scheduling policy as the golden ratio policy. More generally, if $$\phi+I-\delta_1<R<\phi+I-\delta_2,$$

then the performance of the corresponding scheduling policy would be the same as that of the golden ratio policy, for values of $\{\delta_1, \delta_2\}<<1$. The particular values of $\delta_1$ and $\delta_2$ are dependent on the frame size F.

As in the golden ratio policy example described previously, the entries for the mapping table 312 may be determined using products of the index values and the ratio. For example, for a general ratio R, the entries may be determined by calculating $G_i=(i \cdot R \bmod 1)$ for all i, i=0, 1, . . . F−1. Thus, only the fractional part of R is used in the calculation in this particular example. The ratio R can be a rational number or an irrational number. If R is an irrational number, then all the $G_i$ values, for i=0 to F−1, are different. If R is a rational number, then it can be expressed as R=p/q, where p and q are integers and relatively prime. When q>F, all the $G_i$ values are different. For purposes of the illustrative embodiment, we will consider only the ratios that can generate $G_i$ values that are all different. Otherwise, if a given pair of values $G_i$ and $G_j$ are equal, the sorted sequence of values will not be unique, since $G_i$ could be placed before $G_j$ or vice versa.

As noted elsewhere herein, a bit reverse policy can be used to eliminate the need to store a mapping table. However, such a policy may not provide a level of performance comparable to that of golden ratio or general ratio scheduling. Thus, it is often desirable to use a scheduling policy which requires a stored mapping table. If such a table is configured with F entries, where F is the frame size, each entry should have a width w given approximately by $$w=\lceil \log_2 F \rceil,$$

with the total size of the mapping table being approximately w·F. For example, when F is 32K, w should be 15 bits, in which case the total size of the mapping table is w·F=15·32K=480K. Thus, the size of the mapping table increases with the frame size.

To summarize, mapping table entries may be determined using a general ratio R in the following manner: selecting the ratio R such that $G_i \neq G_j$ for i≠j, where $0 \leq (i,j) \leq F-1$; calculating $G_i=(i \cdot R \bmod 1)$, for i=0 to F−1; sorting the $G_i$ values in ascending order; and utilizing the indices of the sorted $G_i$ values as the entries of the mapping table. Of course, the previously-described golden ratio technique, or other techniques, may be used for generating a mapping table suitable for compression in accordance with the present invention.

The following example will be used to demonstrate the mapping table compression technique of the illustrative embodiment. In this example, the ratio R is given by $\sqrt{2}$, and the frame size F is 16. This results in the following set of $G_i$ values:

$G_0=0$
$G_1=1.414 \bmod 1=0.414$
$G_2=2 \cdot 1.414 \bmod 1=0.828$
$G_3=0.242$
$G_4=0.656$
$G_5=0.071$
$G_6=0.485$
$G_7=0.899$
$G_8=0.313$
$G_9=0.727$
$G_{10}=0.142$
$G_{11}=0.556$
$G_{12}=0.970$
$G_{13}=0.384$
$G_{14}=0.798$
$G_{15}=0.213$ The values are then sorted in ascending order, resulting in the sequence $G_0, G_5, G_{10}, G_{15}, G_3, G_8, G_{13}, G_1, G_6, G_{11}, G_4, G_9, G_{14}, G_2, G_7, G_{12}$ The subscript indices become the entries of mapping table 702 as shown in FIG. 7. With reference to this figure, the two left-most columns 700 and 702 comprise the respective index numbers and table entries of the example mapping table, with $M_i$ denoting the i-th mapping table entry. The remaining columns 704, 706 and 708 of FIG. 7 illustrate computations associated with the process of compressing the mapping table. As will be described below, column 708 is a compressed mapping table corresponding to the uncompressed mapping table of column 702.

The compression of the uncompressed mapping table 702 proceeds in the following manner. Column 704 of FIG. 7 shows the results of the computation $S_i=M_i-M_{i-1}$, for i from 1 to F−1. It is apparent from these results that $S_i$ takes on only three different values, i.e., 5, −12, and −7, in this example. Also, $M_0-M_{15}$, which is −12, is one of the three values. Furthermore, the three values are related, in that 5+(−12)=(−7).

Experiments show that these properties are true for any frame size F and any ratio R. For example, when F=1,000 and R=$\sqrt{2}$, the three values are 985, −408 and 577; when F=32,768 and R=$\sqrt{3}$, the three values are 29,681, −10,864 and 18,817; when F=1,000,000 and R is the golden ratio, the three values are 147,466, −845,193 and −992,659.

Because $S_i=M_i-M_{i-1}$ can only be one of three different values V1, V2 and V3, as shown in the $S_i$ column 706 of FIG. 7, we can use three registers, which will be denoted Register 1, Register 2 and Register 3, to store the values of V1, V2 and V3, respectively. In the compressed mapping table, we store only number 1, 2 or 3 in each table entry to represent V1, V2 or V3, respectively. The compressed mapping table uses F−1 entries, where each entry can be 1, 2 or 3, as shown in the $C_i$ column 708 of FIG. 7. Thus, only two bits are needed for each entry. The $C_i$ column 708 of FIG. 7 shows the complete compressed mapping table corresponding to the uncompressed mapping table in the $M_i$ column 702 of FIG. 7.

The registers and compressed mapping table may be stored in internal memory 104, external memory 106, or in a combination of internal and external memory. An advantage of this embodiment is that the substantial compression factor considerably reduces the amount of memory required to store the mapping table. This facilitates the storage of the mapping table in internal memory of the network processor 102, thereby reducing access times associated with a frame mapping scheduling process.

The compressed mapping table described above may be utilized by a frame mapping scheduler in the following manner, utilizing a mapping entry accumulator M. At timeslot 0, there is no compressed mapping table entry, and M=0, which corresponds to the first entry of the uncompressed mapping table. At timeslot 1, the compressed mapping table entry $C_1$ is checked, and returns a value of 1. Checking Register 1 yields the value V1=5. Therefore, the uncompressed mapping table entry at this timeslot is given by $M=M+V1=0+5=5.$ At timeslot 2, the compressed mapping table returns a value of 1. The corresponding uncompressed mapping table entry at this timeslot is computed as $M=M+V1=5+5=10.$ The uncompressed mapping table entries for the other timeslots can be computed in a similar manner.

Using this technique, the original mapping table entries can be computed as needed from the entries of the compressed mapping table and the contents of Register 1, Register 2 and Register 3. The computational penalty associated with the compression is minimal: one need only access the appropriate register to get the corresponding value and perform an additional ADD operation for each timeslot.

Without the compression, the entry of the mapping table can be any number from 0 to F−1. Thus, each entry should be $w=\lceil \log_2 F \rceil$-bit wide for the uncompressed mapping table. When F=16, w is 4. The total memory size of the uncompressed mapping table will be w·F. For the compressed mapping table, each entry is two bits wide. The memory size of the compressed mapping table is about 2·F bits. More precisely, using the compressed method, the memory needed is $2 \cdot (F-1)+3 \cdot \lceil \log_2 F \rceil$ bits, where the second term $3 \cdot \lceil \log_2 F \rceil$ is the total size of the three registers and 2·(F−1) is the size of the compressed table, which has F−1 entries. When F is large, the second term can be ignored.

The mapping table compression of the illustrative embodiment is typically more useful when the frame size F is large. For example, when F is 32K, the uncompressed mapping table size is 480K, while the compressed mapping table size is 64K.

Figure 9:
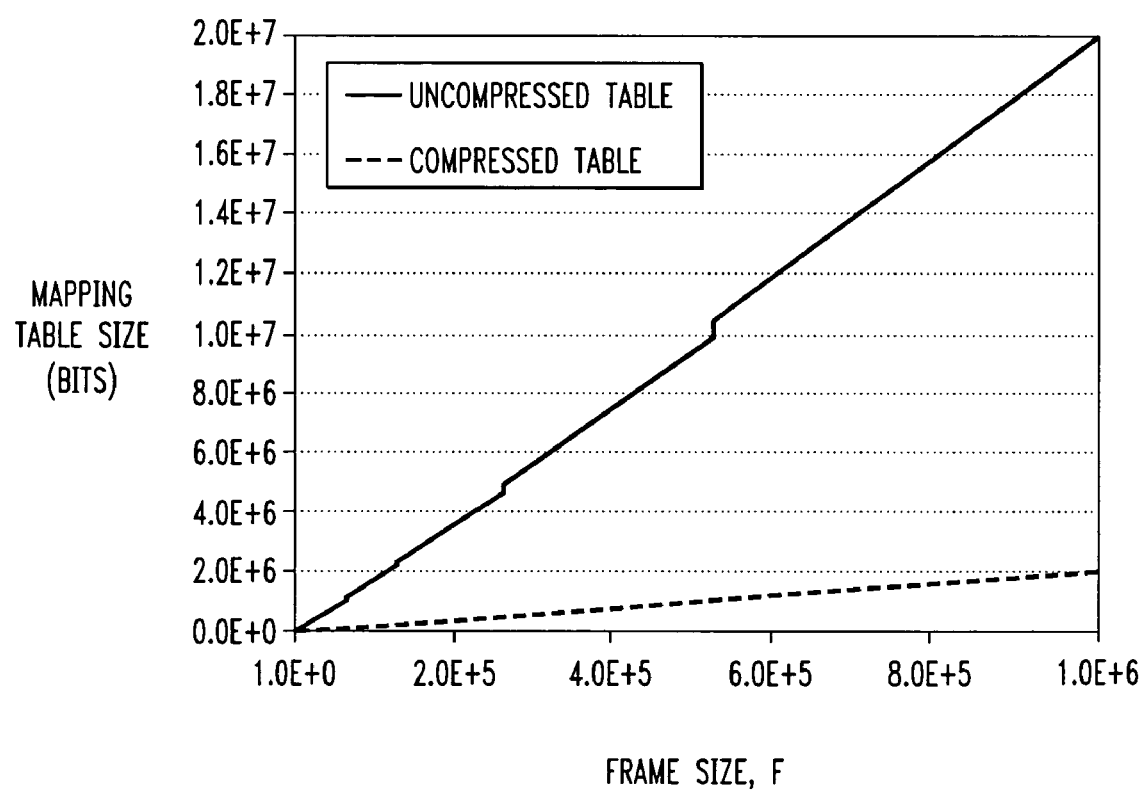
FIG. 9 is a plot showing mapping table size in bits as a function of frame size for uncompressed and compressed mapping tables.

FIG. 8 is a table comparing the uncompressed and compressed table sizes for a number of different examples. Plots of mapping table size in bits as a function of frame size F are shown in FIG. 9.

A frame mapping scheduler in accordance with the invention advantageously provides improved performance over the widely-used WRR scheduler in terms of burstiness, while also exhibiting low complexity. The scheduler is simple and can be easily implemented in hardware, software or combinations thereof.

Although the illustrative embodiments utilize a mapping table in conjunction with a weight table, it is possible for the techniques of the invention to be utilized in embodiments in which the weight table is eliminated. For example, a compressed mapping table of the type described herein can be utilized in embodiments which utilize only the mapping table, or the mapping table in conjunction with one or more additional tables other than a weight table. Those skilled in the art will appreciate that a compressed mapping table has wider applicability in scheduling than the two-table arrangements of the illustrative embodiments.

As indicated above, a given embodiment of the present invention can be implemented as one or more integrated circuits. In such an arrangement, a plurality of identical die are typically formed in a repeated pattern on a surface of a wafer. Each die may include a device as described herein, and may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

Again, it should be emphasized that the above-described embodiments of the invention are intended to be illustrative only. For example, although the illustrative embodiment of FIG. 3 utilizes a scheduler which is separate from its associated table or tables, these elements or portions thereof may be incorporated into scheduling circuitry in accordance with the invention. Similarly, although transmit queues 302 and traffic shaper 304 are described as being separate from scheduler 300 in conjunction with the FIG. 3 embodiment, the associated functionality may be implemented at least in part within scheduling circuitry in accordance with the invention. Other embodiments can use different types and arrangements of processing elements for implementing the described functionality. For example, the tables may be implemented in internal memory, external memory or combinations of internal and external memory. In the case of internal memory, at least a portion of such memory may be internal to the scheduling circuitry. A variety of different types of weight-based scheduling may be used, other than WRR scheduling. Also, policies other than the golden ratio and example general ratio policies of the illustrative embodiments may be used to generate mapping table entries as described herein. Furthermore, the particular compression procedure applied to a given mapping table may be varied as required to accommodate the needs of a given application. These and numerous other alternative embodiments within the scope of the following claims will be apparent to those skilled in the art.

What is claimed is:

1. A processing device for use in a communication system, the device comprising:

scheduling circuitry configured to schedule data blocks for transmission from a plurality of transmission elements in timeslots of a frame, utilizing at least a mapping table;

the mapping table comprising at least one entry specifying a mapping between a particular timeslot of the frame and a particular one of the transmission elements;

the scheduling circuitry being further configured to determine a particular transmission element to be scheduled in a given timeslot by accessing a corresponding mapping table entry to identify the particular transmission element; and memory circuitry associated with the scheduling circuitry and configurable to store at least a portion of the mapping table in a compressed format;

the mapping table being stored as a compressed mapping table in which a particular entry identifies one of a plurality of stored values which is processed to determine a corresponding uncompressed mapping table entry.

2. The processing device of claim 1 wherein the particular entry of the compressed mapping table identifies one of a plurality of stored values which if added to an accumulator will result in the corresponding uncompressed mapping table entry.

3. The processing device of claim 1 wherein the compressed mapping table is generated by determining, for i=1 to F−1 where F denotes the number of schedulable timeslots in the frame, which particular one of a plurality of possible different values $S_i = M_i - M_{i-1}$ is associated with an i-th entry $M_i$ of the uncompressed mapping table, and storing in the corresponding entry of the compressed mapping table an identifier of a memory location storing that particular one of the plurality of possible different values.

4. The processing device of claim 3 wherein the memory location comprises a register.

5. The processing device of claim 4 wherein each of the plurality of possible different values $S_i$ is stored in a different register, the compressed memory table comprising F−1 entries each identifying one of the registers.

6. The processing device of claim 1 wherein the particular entry of the compressed mapping table identifies one of three different stored values generated from the uncompressed mapping table entries.

7. The processing device of claim 6 wherein a difference between a first entry of the uncompressed mapping table and a last entry of the uncompressed mapping table results in one of the three different stored values.

8. The processing device of claim 1 wherein a given one of the values in the plurality of stored values is generated as a difference between values in adjacent entries of the uncompressed mapping table.

9. The processing device of claim 1 wherein an uncompressed mapping table entry is generated from a corresponding compressed mapping table entry by utilizing the compressed mapping table entry to identify a particular one of the plurality of stored values, and adding the identified value to a current value of an accumulator to obtain the uncompressed mapping table entry.

10. The processing device of claim 1 wherein the uncompressed mapping table has a first entry which is always zero, such that the compressed mapping table need not include an entry corresponding to the first entry of the uncompressed mapping table.

11. The processing device of claim 1 wherein an amount of memory capacity required to store the compressed mapping table is given approximately by 2·(F−1) bits, where F denotes the number of schedulable timeslots in the frame.

12. The processing device of claim 1 wherein the compressed mapping table comprises at least F−1 entries each comprising two bits, where F denotes the number of schedulable timeslots in the frame.

13. The processing device of claim 1 wherein an amount of memory capacity required to store the plurality of stored values is given approximately by:

$$3 \cdot \lceil \log_2 F \rceil \text{ bits},$$

where F denotes the number of schedulable timeslots in the frame.

14. The processing device of claim 1 wherein the scheduling circuitry utilizes a weight table in conjunction with the mapping table, the weight table comprising a plurality of entries, each of the entries identifying a particular one of the transmission elements, and wherein the scheduling circuitry is further configured to determine a particular transmission element to be scheduled in a given timeslot by accessing a corresponding mapping table entry and utilizing a resultant value to access the weight table, the weight table associating each of the transmission elements with one or more of the timeslots of the frame.

15. The processing device of claim 1 wherein entries of the mapping table are predetermined utilizing a designated ratio.

16. The processing device of claim 15 wherein the designated ratio comprises a golden ratio.

17. The processing device of claim 15 wherein the entries of the mapping table are determined by:

utilizing the designated ratio to compute a plurality of $G_i$ values;

sorting the computed values in a specified order; and taking the entries as a sequence of subscript indices.

18. The processing device of claim 1 wherein the memory circuitry comprises at least one of internal memory and external memory of the processing device.

19. The processing device of claim 1 wherein the processing device comprises a network processor integrated circuit.

20. A method for use in a processing device of a communication system, the method comprising:

scheduling data blocks for transmission from a plurality of transmission elements, utilizing a mapping table;

the mapping table comprising at least one entry specifying a mapping between a particular timeslot of the frame and a particular one of the transmission elements;

a particular transmission element to be scheduled in a given timeslot being determined by accessing a corresponding mapping table entry to identify the particular transmission element;

the mapping table being stored in a compressed format, as a compressed mapping table in which a particular compressed mapping table entry identifies one of a plurality of stored values which is processed to determine a corresponding uncompressed mapping table entry.

21. An integrated circuit comprising:

a processing device having scheduling circuitry configured to schedule data blocks for transmission from a plurality of transmission elements in timeslots of a frame, utilizing at least a mapping table;

the mapping table comprising at least one entry specifying a mapping between a particular timeslot of the frame and a particular one of the transmission elements;

the scheduling circuitry being further configured to determine a particular transmission element to be scheduled in a given timeslot by accessing a corresponding mapping table entry to identify the particular transmission element;

wherein the mapping table is stored in a compressed format in memory circuitry associated with the scheduling circuitry;

the mapping table being stored as a compressed mapping table in which a particular entry identifies one of a plurality of stored values which is processed to determine a corresponding uncompressed mapping table entry.

* * * * *